United States Patent
Natanzon et al.

(10) Patent No.: US 10,649,861 B1
(45) Date of Patent: May 12, 2020

(54) OPERATIONAL RECOVERY OF SERVERLESS APPLICATIONS IN A CLOUD-BASED COMPUTE SERVICES PLATFORM

(71) Applicant: EMC IP Holding Company LLC, Hopkinton, MA (US)

(72) Inventors: Assaf Natanzon, Tel Aviv (IL); Amit Lieberman, Kefar Sava (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 342 days.

(21) Appl. No.: 15/666,793

(22) Filed: Aug. 2, 2017

(51) Int. Cl.
  *G06F 16/00* (2019.01)
  *G06F 11/14* (2006.01)
  *H04L 29/08* (2006.01)
  *H04L 12/66* (2006.01)

(52) U.S. Cl.
  CPC ...... *G06F 11/1469* (2013.01); *G06F 11/1464* (2013.01); *H04L 12/66* (2013.01); *H04L 67/10* (2013.01)

(58) Field of Classification Search
  CPC .. G06F 11/1469; G06F 11/1464; H04L 12/66; H04L 67/10
  USPC .................................................. 707/739, 650
  See application file for complete search history.

(56) References Cited

U.S. PATENT DOCUMENTS

| | | | | |
|---|---|---|---|---|
| 6,067,550 A | * | 5/2000 | Lomet | G06F 11/1471 |
| 6,490,594 B1 | * | 12/2002 | Lomet | G06F 16/24552 |
| 6,978,279 B1 | * | 12/2005 | Lomet | G06F 11/1471 |
| 8,577,842 B1 | | 11/2013 | Nagargadde et al. | |
| 8,713,362 B2 | * | 4/2014 | Griffith | G06F 11/1443 714/13 |
| 9,461,969 B2 | * | 10/2016 | Watt | H04L 63/0272 |
| 9,477,415 B2 | * | 10/2016 | Hsu | G06F 3/0655 |
| 9,619,350 B1 | * | 4/2017 | Ambat | G06F 11/1435 |
| 9,684,607 B2 | * | 6/2017 | Teletia | G06F 12/122 |

(Continued)

OTHER PUBLICATIONS

Amazon Web Services, Inc., "AWS Serverless Mutli-Tier Architectures Using Amazon API Gateway and AWS Lambda," Amazon Web Services, Nov. 2015, 20 pages.

(Continued)

*Primary Examiner* — Hanh B Thai
(74) *Attorney, Agent, or Firm* — Ryan, Mason & Lewis, LLP

(57) ABSTRACT

An apparatus in one embodiment comprises at least one processing platform including a plurality of processing devices. The processing platform is configured to receive a request to execute a serverless application, to initiate execution of the serverless application responsive to the request, to utilize one or more application function mappings to invoke one or more application functions with each such application function interacting with one or more backend services in executing the serverless application, to capture state of the serverless application for a particular point in time, and to perform operational recovery of the serverless application for the particular point in time utilizing the captured state. Capturing state of the serverless application for the particular point in time comprises capturing the state in accordance with a previously-generated serverless application manifest characterizing the application function mappings, the application functions, and the backend services.

20 Claims, 5 Drawing Sheets

(56) References Cited

U.S. PATENT DOCUMENTS

| | | | | |
|---|---|---|---|---|
| 9,893,947 | B2* | 2/2018 | Morgan | H04L 41/12 |
| 9,906,415 | B2* | 2/2018 | Morgan | H04L 41/12 |
| 10,248,345 | B1* | 4/2019 | Dickson | G06F 3/0631 |
| 10,409,995 | B1 | 9/2019 | Wasiq et al. | |
| 2001/0049704 | A1* | 12/2001 | Hamburg | G06F 17/24 |
| | | | | 715/234 |
| 2003/0236851 | A1* | 12/2003 | Cuddihy | H04L 67/1095 |
| | | | | 709/214 |
| 2005/0038836 | A1* | 2/2005 | Wang | G06F 3/0601 |
| 2005/0055444 | A1* | 3/2005 | Venkatasubramanian | |
| | | | | G06F 11/1461 |
| | | | | 709/225 |
| 2005/0165868 | A1* | 7/2005 | Prakash | G06F 11/1464 |
| 2005/0172093 | A1* | 8/2005 | Jain | G06F 3/0601 |
| | | | | 711/162 |
| 2006/0041602 | A1* | 2/2006 | Lomet | G06F 11/1471 |
| 2008/0115134 | A1* | 5/2008 | Elliott | G06F 9/4856 |
| | | | | 718/101 |
| 2008/0307347 | A1* | 12/2008 | Cisler | G06F 11/1458 |
| | | | | 715/771 |
| 2009/0157882 | A1* | 6/2009 | Kashyap | H04L 69/16 |
| | | | | 709/227 |
| 2010/0049929 | A1* | 2/2010 | Nagarkar | G06F 9/45533 |
| | | | | 711/162 |
| 2010/0132022 | A1* | 5/2010 | Venkatasubramanian | |
| | | | | G06F 3/0601 |
| | | | | 726/7 |
| 2012/0233123 | A1* | 9/2012 | Shisheng | G06F 11/004 |
| | | | | 707/639 |
| 2014/0149354 | A1* | 5/2014 | Chan | G06F 9/455 |
| | | | | 707/639 |
| 2015/0096011 | A1* | 4/2015 | Watt | H04L 63/0272 |
| | | | | 726/15 |
| 2015/0317216 | A1* | 11/2015 | Hsu | G06F 3/0655 |
| | | | | 707/679 |
| 2016/0048408 | A1* | 2/2016 | Madhu | G06F 11/2097 |
| | | | | 718/1 |
| 2016/0162378 | A1 | 6/2016 | Garlapati et al. | |
| 2016/0170666 | A1* | 6/2016 | Hsu | G06F 3/0655 |
| | | | | 711/162 |
| 2016/0246735 | A1* | 8/2016 | Teletia | G06F 12/122 |
| 2016/0292045 | A1* | 10/2016 | Pillai | G06F 11/1464 |
| 2017/0060605 | A1* | 3/2017 | Huang | G06F 16/13 |
| 2017/0270055 | A1* | 9/2017 | Teletia | G06F 12/122 |
| 2017/0352115 | A1 | 12/2017 | Trevathan et al. | |
| 2019/0182128 | A1 | 6/2019 | Shimamura et al. | |

OTHER PUBLICATIONS

"AWS Step Functions, Build Distributed Applications Using Visual Workflows," https://aws.amazon.com/step-functions/, 2017, 2 pages.
Amazon Web Services, Inc., "AWS Lambda Developer Guide," Amazon Web Services, 2017, 473 pages.
wikipedia.com, "Serverless Computing," https://en.wikipedia.org/wiki/Serverless_computing, Jul. 17, 2017, 4 pages.

* cited by examiner

OPERATIONAL RECOVERY OF SERVERLESS APPLICATIONS IN A CLOUD-BASED COMPUTE SERVICES PLATFORM

FIELD

The field relates generally to information processing systems, and more particularly to compute services in information processing systems.

BACKGROUND

Many information processing systems are configured to provide cloud-based compute services to users over a network. In some cases, the compute services utilize so-called serverless applications that do not maintain application state information. Instead, state is kept in external persistent services such as databases and object stores. As a result, recovering a serverless application after a failure or other issue can be problematic under conventional practice. For example, it is often necessary for an administrator or other user to perform manual backups of the application state for a serverless application at multiple points in time in order to permit recovery from those points in time. Such manual backups of serverless applications are complex, time consuming and error prone. In some cases, an administrator or other user may have to coordinate multiple sets of complicated processes to document and track potentially large numbers of changes in versions as well as deployment runtime environments for a variety of distinct components of a serverless application. It is therefore unduly difficult to guarantee successful operational recovery for such applications.

SUMMARY

Illustrative embodiments provide techniques for operational recovery of serverless applications in a cloud-based compute services platform. For example, some embodiments are configured to implement automated capture of serverless application state utilizing corresponding previously-generated serverless application manifests in the cloud-based compute services platform. Such embodiments can advantageously provide significantly improved efficiency in automated capture and recovery of serverless application state from desired points in time without the need for manual intervention.

In one embodiment, an apparatus comprises at least one processing platform including a plurality of processing devices. The processing platform is configured to receive a request to execute a serverless application, to initiate execution of the serverless application responsive to the request, to utilize one or more application function mappings to invoke one or more application functions with each such application function interacting with one or more backend services in executing the serverless application, to capture state of the serverless application for a particular point in time, and to perform operational recovery of the serverless application for the particular point in time utilizing the captured state.

Capturing state of the serverless application for the particular point in time comprises capturing the state in accordance with a previously-generated serverless application manifest that comprises the one or more application function mappings, container image identifiers for respective ones of the application functions, and descriptors for respective ones of the one or more backend services. The descriptors of the backend services advantageously allow their respective states to be captured as part of capturing the state of the serverless application for the particular point in time.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
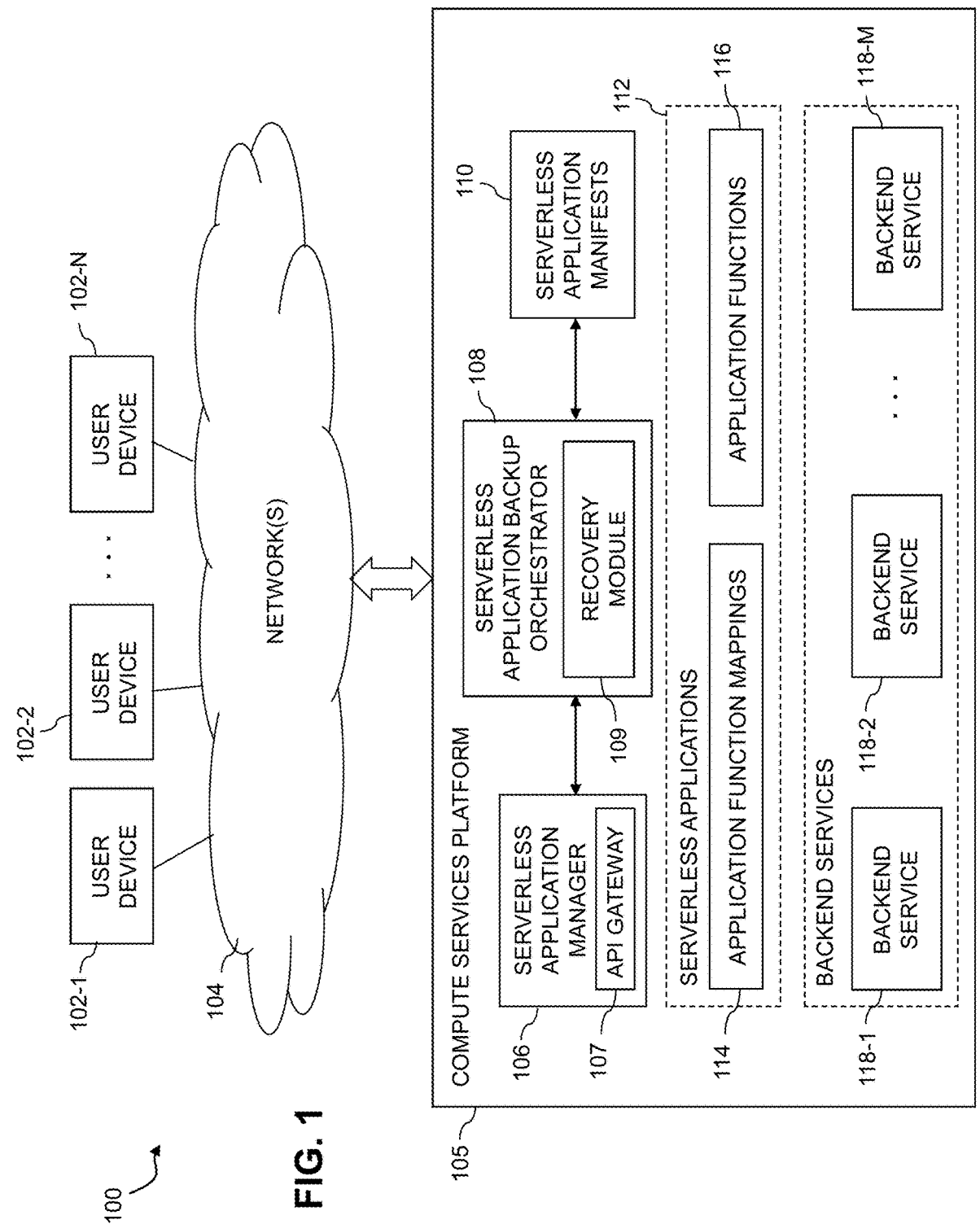
FIG. 1 is a block diagram of an information processing system comprising a cloud-based compute services platform configured for operational recovery of serverless applications in an illustrative embodiment.

FIG. 1 shows an information processing system 100 configured in accordance with an illustrative embodiment. The information processing system 100 comprises user devices 102-1, 102-2, . . . 102-N. The user devices 102 communicate over a network 104 with a compute services platform 105.

The user devices 102 can comprise, for example, desktop, laptop or tablet computers, mobile telephones, or other types of processing devices capable of communicating with the compute services platform 105 over the network 104. The variable N and other similar index variables herein such as M are assumed to be arbitrary positive integers greater than or equal to two.

The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The compute services platform 105 implements compute services on behalf of respective cloud infrastructure tenants each corresponding to one or more users associated with respective ones of the user devices 102. The compute services are assumed to include execution of one or more serverless applications on behalf of each of one or more users associated with respective user devices 102. The serverless applications in some case are provided by the compute services platform 105 under a Function-as-a-Service (FaaS) model.

The compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

As a more particular example, the compute services platform 105 in some embodiments may be configured to implement a serverless application architecture similar to the AWS Lambda serverless application architecture, as described in reference documents of Amazon Web Services, Inc. entitled "AWS Lambda: Developer Guide," 2017, and "AWS Serverless Multi-Tier Architectures, Using Amazon API Gateway and AWS Lambda," November 2015, both of which are incorporated by reference herein.

These and other serverless application architectures referred to herein allow users to build and run applications without the need to provision, maintain or otherwise manage any servers. Although a given compute services platform implementing such an architecture may include servers, the applications are referred to as "serverless" in that the applications can be run and scaled without user reference to any particular server or servers and the user is therefore relieved of any server-related issues. The term "serverless" should therefore not be construed as indicating that a compute services platform or other processing platform that executes a given serverless application cannot include any servers. Advantages of serverless application architectures include scalability and reduced operational costs as well as finely-grained metering of compute services actually utilized by platform users.

The compute services platform 105 in the embodiment of FIG. 1 illustratively comprises a serverless application manager 106 having an application programming interface (API) gateway 107. The serverless application manager 106 interacts with a serverless application backup orchestrator 108 that includes a recovery module 109. The serverless application backup orchestrator 108 utilizes serverless application manifests 110 to control backup and recovery of corresponding serverless applications.

The compute services platform 105 in the FIG. 1 embodiment further comprises serverless applications 112 each of which includes one or more application function mappings 114 and one or more application functions 116. The application functions 116 interact with backend services 118-1, 118-2, . . . 118-M of the compute services platform 105. The serverless applications 112 can in some cases be configured to implement a compute services solution for a particular business or other organization, such as a shopping cart application for an electronic commerce web site or a mobile banking application for a financial institution. A wide variety of different types of serverless applications can be implemented in the compute services platform 105 in order to meet the particular needs of platform users.

It is assumed that the compute services platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The serverless application manager 106 of the compute services platform 105 is configured to receive a request to execute one of the serverless applications 112 and to initiate execution of the serverless application responsive to the request. The request initiating execution of the serverless application is received in the API gateway 107 of the compute services platform 105 from one of the user devices 102 over network 104. The request to initiate execution of the serverless application can also be triggered by particular events, such as the creation of an object in an object store bucket, an operation on a database, and many other different types of events. As noted above, the serverless applications in some case are executed by the compute services platform in accordance with an FaaS model.

A given one of the serverless applications 112 executed in the compute services platform 105 under the control of the serverless application manager 106 illustratively comprises one or more of the application function mappings 114, one or more of the application functions 116 and utilizes one or more of the backend services 118.

Accordingly, the serverless application manager 106 utilizes one or more of the application function mappings 114 to invoke one or more of the application functions 116 with each such application function interacting with one or more of the backend services 118 in executing the serverless application.

The application function mappings 114 each specify one or more conditions under which particular ones of the application functions 116 are invoked. For example, the conditions specified by the application function mappings 114 may comprise respective events each relating to one or more of the backend services 118.

These and other conditions instruct the compute services platform 105 to activate the corresponding instances of the application functions 116. Examples of conditions that may be part of one or more of the application function mappings 114 include an object being uploaded to an AWS S3 bucket, a transaction being committed on a relational database, and a message being sent to a queue.

Other example conditions relate to events associated with designated URL endpoints. For example, when a POST request arrives at a URL endpoint denoted my-app-dns/my-app-api/data. These and other conditions of this type not only indicate when to execute the application functions, but also map particular endpoints to certain application functions.

The various conditions that may be specified by the application function mappings 114 can include simple conditions as well as more complex conditions each based on filtering of multiple simpler conditions.

The application functions 116 are each assumed to execute in one or more stateless ephemeral containers of the compute services platform 105. Such containers can include the above-noted Docker containers or other types of LXCs. The containers are illustratively configured to respond to external events and to interact with backend services 118. The application functions 116 more particularly comprise stateless functions packaged as containers that will be invoked according to the conditions specified in one or more of the application function mappings 114. The application functions 116 can interact with one or more of the backend services 118 to read and store data using those backend services. For example, a given one of the application functions 116 can comprise a Python script that reads an image from an AWS S3 object store and creates a thumbnail for it.

The backend services 118 illustratively comprise at least one of a database service, an object storage service and a message processing service, although a wide variety of additional or alternative services can be supported in the compute services platform 105. More particular examples of backend services 118 include AWS S3, GCP Cloud Storage, Microsoft Azure Blob Storage, DynamoDB, Aurora and Oracle database. Although the backend services 118 in the present embodiment are shown as part of the compute services platform 105, at least a subset of these backend services in other embodiments may be implemented on one or more other processing platforms that are accessible to the compute services platform 105 over one or more networks.

Figure 2:
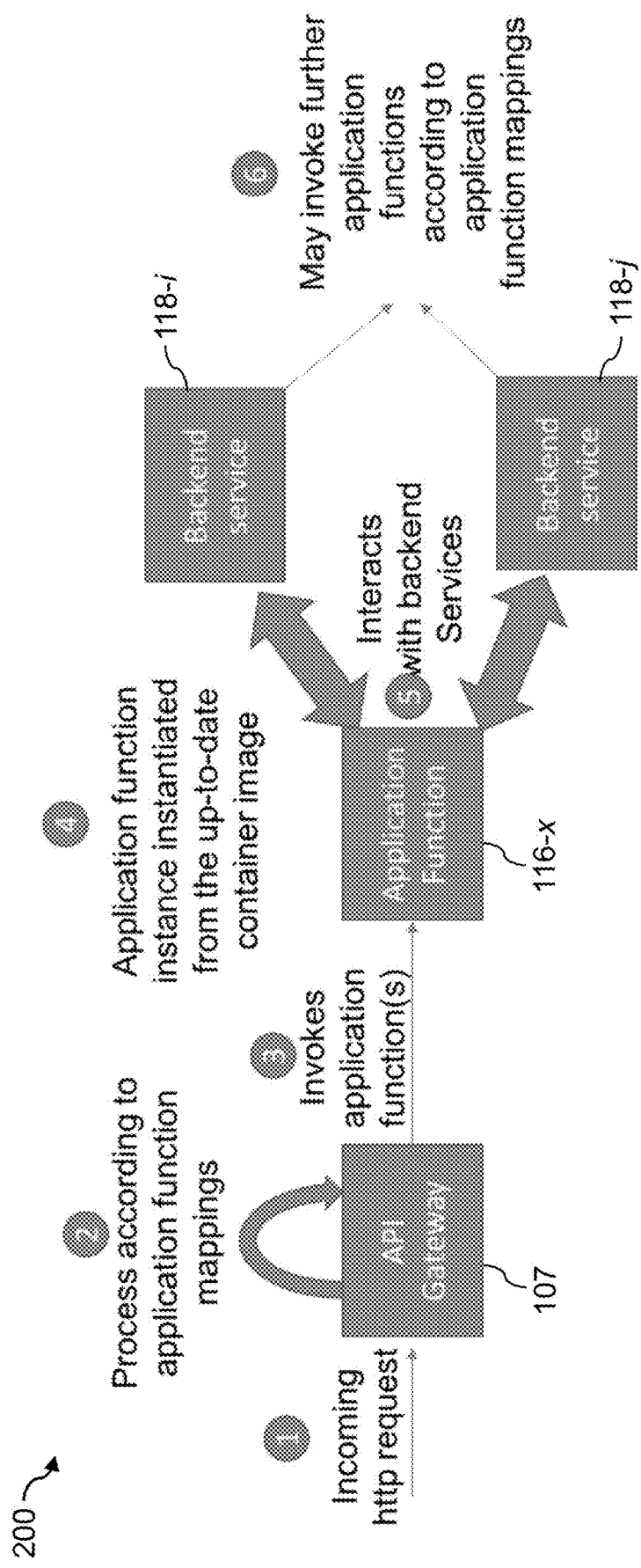
FIG. 2 is a diagram showing interactions between application function mappings, application functions and backend services in a cloud-based compute services platform in an illustrative embodiment.

FIG. 2 illustrates example interactions 200 between particular ones of the application function mappings 114, application functions 116 and backend services 118 of compute services platform 105. These example interactions 200 are assumed to occur in conjunction with the execution of a given one of the serverless applications 112 under the control of the serverless application manager 106.

The interactions 200 shown in FIG. 2 are arranged in multiple steps denoted as Step 1 through Step 6, and involve API gateway 107, a particular application function 116-x, and particular backend services 118-i and 118-j.

In Step 1, an incoming request to initiate execution of the serverless application is received in the API gateway 107 of the serverless application manager 106. The request in this embodiment more particularly comprises an HTTP request received in the compute services platform 105 over the network 104 from one of the user devices 102.

In Step 2, the incoming request is processed by the serverless application manager 106 using one or more of the application function mappings 114 that are determined to be associated with the request.

In Step 3, the API gateway 107 based on the processing in accordance with the one or more of the application function mappings 114 invokes one or more of the application functions 116. This illustratively includes at least application function 116-x, and may include additional application functions.

In Step 4, an instance of the application function 116-x is instantiated by the serverless application manager 106 using a corresponding up-to-date container image.

In Step 5, the instantiated application function 116-x interacts with multiple backend services including the backend services 118-i and 118-j.

In Step 6, each of the backend services 118-i and 118-j may invoke one or more additional ones of the application functions 116 in accordance with the particular serverless application being executed.

It is to be appreciated that these particular process steps, interactions and other features and functionality illustrated in the embodiment of FIG. 2 are presented by way of example only and can be varied in other embodiments.

Referring again to FIG. 1, the serverless application backup orchestrator 108 of the compute services platform 105 is configured to capture state of the serverless application for a particular point in time. The state of the serverless application for the particular point in time is captured in accordance with a corresponding previously-generated one of the serverless application manifests 110.

For example, in some embodiments, each of the serverless applications 112 has a corresponding one of the serverless application manifests 110 that directs the manner in which backups are to be generated for that serverless application.

A particular one of the serverless application manifests 110 for use in capturing state of a given one of the serverless applications in the present embodiment comprises the one or more application function mappings associated with that serverless application, container image identifiers for respective ones of the application functions invoked by the one or more application function mappings, and descriptors for respective ones of the one or more backend services with which the invoked application functions interact in executing the serverless application.

The container image identifiers can include information such as container binaries or code snaps as well as other types of information. Accordingly, the term "container image identifier" as used herein is intended to be broadly construed. Illustrative embodiments are therefore not limited to capturing state using container binaries and may additionally or alternative utilize code snaps or other types of information characterizing one or more of the application functions in conjunction with capturing state.

The backend services descriptors in some case include access and provisioning information (e.g., how to access and/or provision backend services). It is to be appreciated, however, that different arrangements of metadata and other information can be included in a serverless application manifest in other embodiments.

For example, the serverless application manifest may additionally or alternatively comprise, for each of the one or more application functions of the serverless application, a version indicator for the corresponding container image (e.g., Docker image), instructions for obtaining corresponding application function binaries or associated code, and one or more bindings of the application function to respective ones of the backend services with which the application function interacts. The instructions for obtaining corresponding application function binaries or associated code in such an arrangement illustratively comprise instructions for downloading one or more of the application function binaries or associated code from a container registry (e.g., Docker registry) or code hub. Other information that may be included in the serverless application manifest includes a version indicator for that serverless application manifest.

The serverless application manifest therefore comprises metadata and other information relating to a particular serverless application deployment and can be used both to deploy and to back up the serverless application. The particular configuration of the serverless application manifest can be specified by a developer or other user of the corresponding serverless application. The serverless application manifest advantageously serves to automate the backup orchestration of serverless applications. It can in some cases be defined by a business organization to reflect the granularity of data protection to be applied.

A given one of the serverless application manifests 110 may be automatically generated in conjunction with execution of its corresponding one of the serverless applications 112 in the compute services platform 105.

For example, the given serverless application manifest may be generated prior to an initial execution of the corresponding serverless application in the compute services platform 105. In such an arrangement, initiating execution of the serverless application responsive to a request may include initiating execution of the serverless application based at least in part on the server application manifest.

In capturing the state of the serverless application for the particular point in time, the serverless application backup orchestrator 108 is illustratively configured to store metadata for the one or more application function mappings that are part of the serverless application manifest, to store a copy of a current binary or associated code for each application function container image identified in the serverless application manifest, and to generate backups for each backend service having a descriptor in the serverless application manifest. The serverless application backup orchestrator 108 then generates additional metadata combining the metadata for the one or more application function mappings, the one or more stored copies of the current binaries or associated code, and the backups of the one or more backend services, into a corresponding serverless application backup for the particular point in time.

It is therefore apparent that the serverless application backup orchestrator 108 in this embodiment is responsible for capturing state of all components of a given serverless application. The points in time at which backups of the serverless application are taken can be in accordance with intervals specified by a corresponding user. For example, a user associated with a particular enterprise or other organization can take into account business continuity requirements in establishing appropriate points in time at which backups of the serverless application will be taken. Such requirements can include service level agreements (SLAs) that may be in place with customers of the organization.

As another example, the serverless application backup orchestrator 108 is illustratively configured to execute the following operations in capturing state of a serverless application at a particular point in time:

1. Store a copy of the current binary of each application function container image that is part of the serverless application manifest. Additionally or alternatively, corresponding code can be stored. References herein to storage of binaries or associated code should therefore be understood to encompass storage of binaries and/or code. The code may more particularly comprise source code while the corresponding binaries may refer to such source code after compilation into machine language.

2. Execute backup for all backend services that are part of the services application manifest.

3. Store metadata for all application function mappings that are part of the services application manifest. Additional related information such as environmental variables is also stored.

4. Create a metadata entry relating all the above copies, backups and metadata to a single serverless application backup.

This serverless application state capture process is just an example, and numerous alternative techniques can be used to capture state of a serverless application in the serverless application backup orchestrator 108.

The recovery module 109 of the serverless application backup orchestrator 108 is configured in the present embodiment to perform operational recovery of a serverless application for a particular point in time utilizing its state as captured in accordance with the corresponding serverless application manifest.

For example, in some embodiments the recovery module 109 is configured to obtain the serverless application backup for the particular point in time, to update the one or more application function mappings based at least in part on the stored metadata, to redeploy the application function container images from respective stored copies of their current binaries or associated code, and to recover the backend services from their respective backups.

The recovered serverless application can then be executed under the control of one or both of the serverless application manager 106 and the serverless application backup orchestrator 108 using the updated one or more application function mappings, the redeployed application function container images and the recovered backend services.

As another example, the serverless application backup orchestrator 108 is illustratively configured to execute the following operations in recovering the serverless application using captured state for a particular point in time:

1. Allow the user to choose which of a plurality of backups of the serverless application to use from a list of available backups.

2. Generate commands for a target portion of the compute services platform 105 that will:
   (i) update the application function mappings to the mappings that were in use when the selected backup was captured;
   (ii) redeploy application function container images from the selected backup; and
   (iii) recover all applicable backend services using the selected backup.

3. Execute the commands against the target portion of the compute services platform 105 in order to recover the serverless application.

This serverless application recovery process is just an example, and numerous alternative techniques can be used to recover a given serverless application from captured state in the serverless application backup orchestrator 108.

In illustrative embodiments, the serverless application backup orchestrator 108 via its recovery module 109 is configured to recover a given serverless application by recovering its corresponding instances of the application function mappings 114, application functions 116 and backend services 118 at a particular point in time. The recovered serverless application is illustratively configured such that the application function images match corresponding schema of the restored backend services with which they interact and application function mapping conditions are also restored to the same point in time. The serverless application comprising the various instances of application function mappings 114, application functions 116 and backend services 118 will therefore operate in exactly the same manner as it did at the point in time for which the backup was taken.

In some embodiments, the serverless application backup orchestrator 108 is configured to capture state of application functions and backend services data of the serverless application at each of a plurality of different points in time in accordance with the previously-generated serverless application manifest. The recovery module 109 can then permit user selection of at least one of a plurality of serverless application backups characterizing the captured state for respective ones of the points in time, and to recover the serverless application using the selected at least one of the serverless application backups.

In an arrangement of this type, the user may be permitted to select a first one of the serverless application backups for recovering the application functions and a second one of the serverless application backups different than the first serverless application backup for recovering the backend services data. Such an arrangement allows the application functions and the backend services data of the serverless application to be separately recoverable from different ones of the serverless application backups corresponding to respective different points in time as selected by the user.

It is also possible in recovering a given serverless application to restore the application functions but not the backend services data, or to restore the backend services data but not the application functions. As noted above, the application functions and the backend services data can both be recovered, to the same or different points in time using the same or different backups of the serverless application.

The serverless application backup orchestrator 108 in some embodiments is implemented as part of an orchestration layer implemented in an otherwise conventional serverless application architecture implemented in the compute services platform 105. Other system components such as the serverless application manager 106 can interact with such an orchestration layer of the compute services platform 105.

Further details regarding capture and recovery of serverless application state in the compute services platform 105 will be described below in conjunction with the flow diagram of FIG. 3.

In the FIG. 1 embodiment, the compute services platform 105 is assumed to comprise one or more storage systems configured to store serverless application manifests 110 and other information relating to serverless applications 112, backend services 118 and other system functionality.

Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of compute services platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and one or more associated storage systems that are configured to communicate over one or more networks.

As a more particular example, the serverless application manager 106 and serverless application backup orchestrator 108 can each be implemented in the form of one or more LXCs running on one or more VMs. Other arrangements of one or more processing devices of a processing platform can be used to implement the serverless application manager 106 and serverless application backup orchestrator 108 as well as other components of the compute services platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the compute services platform 105 to reside in different data centers. Numerous other distributed implementations of the compute services platform 105 are possible.

Accordingly, one or both of the serverless application manager 106 and the serverless application backup orchestrator 108 can each be implemented in a distributed manner so as to comprise a plurality of distributed components implemented on respective ones of the plurality of compute nodes of the compute services platform 105.

Although illustratively shown as being implemented within the compute services platform 105, components such as serverless application manager 106 and serverless application backup orchestrator 108 in other embodiments can be implemented at least in part externally to the compute services platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as serverless application manager 106 and serverless application backup orchestrator 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for automated capture and recovery of serverless application state information can be offered to cloud infrastructure customers or other users as part of an FaaS or PaaS offering.

The operation of the information processing system 100 will now be described in further detail with reference to the flow diagram of FIG. 3. The process as shown includes steps 300 through 308, and is suitable for use in the system 100 but is more generally applicable to other types of information processing systems comprising compute services platforms configured to run serverless applications.

In step 300, a request is received to execute a serverless application.

In step 302, execution of the serverless application is initiated responsive to the request.

In step 304, one or more application function mappings are utilized to invoke one or more application functions with each such application function interacting with one or more backend services in executing the serverless application.

In step 306, state of the serverless application for a particular point in time is captured. The state of the serverless application is illustratively captured for the particular point in time in accordance with a previously-generated serverless application manifest that comprises the one or more application function mappings, container image identifiers for respective one of the application functions, and descriptors for respective ones of the one or more backend services. Additional or alternative information can be included in the server application manifest in other embodiments.

Capturing the state of the serverless application for the particular point in time may further comprise storing metadata for the one or more application function mappings that are part of the serverless application manifest, storing a copy of a current binary or associated code for each application function container image identified in the serverless application manifest, and generating backups for each backend service having a descriptor in the serverless application manifest.

Additional metadata is then generated in order to combine the metadata for the one or more application function mappings, the one or more stored copies of the current binaries or associated code, and the backups of the one or more backend services, into a serverless application backup for the particular point in time.

In step 308, operational recovery of the serverless application for the particular point in time is performed utilizing the captured state. For example, the operational recovery may be performed by obtaining the serverless application backup for the particular point in time, updating the one or more application function mappings based at least in part on the stored metadata, redeploying the application function container images from respective stored copies of their current binaries or associated code, and recovering the backend services from their respective backups. The recovered serverless application is then executed utilizing the updated one or more application function mappings, the redeployed application function container images and the recovered backend services.

As mentioned previously, in some embodiments the state of application functions and backend services data of the serverless application are captured at each of a plurality of different points in time in accordance with the previously-generated serverless application manifest. Users may then be permitted to select at least one of a plurality of serverless application backups characterizing the captured state for respective ones of the points in time. The serverless application is then recovered using the selected at least one of the serverless application backups. Such an arrangement can allow the user to select a first one of the serverless application backups for recovering the application functions and a second one of the serverless application backups different than the first serverless application backup for recovering the backend services data. The application functions and the backend services data of the serverless application are thereby separately recoverable from different ones of the serverless application backups corresponding to respective different points in time.

Figure 3:
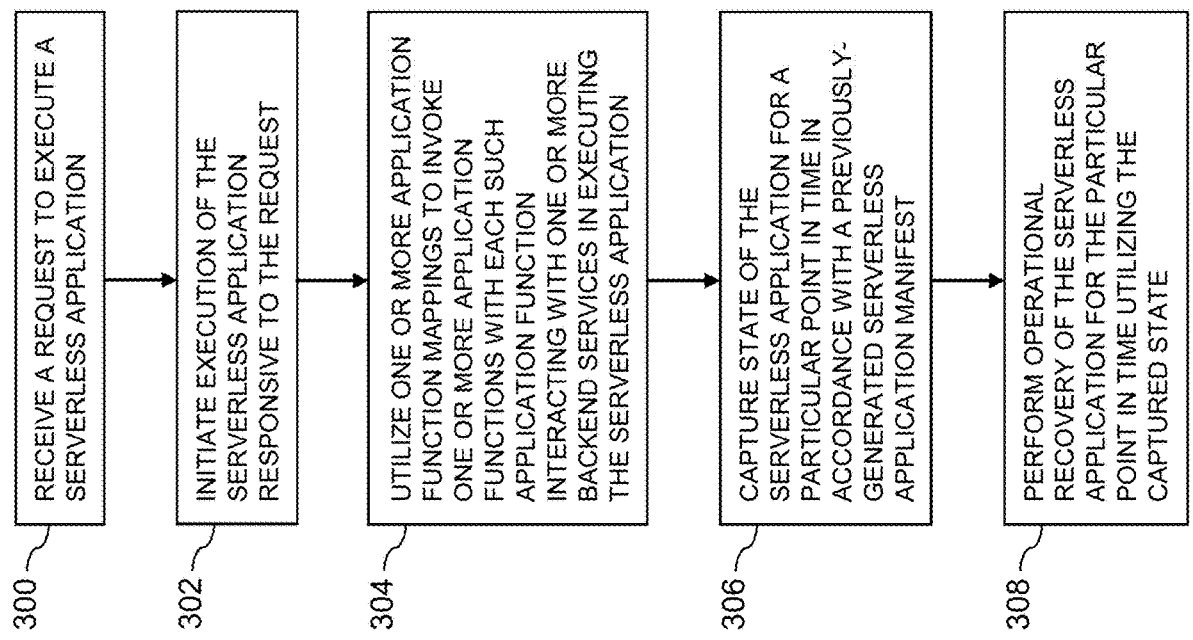
FIG. 3 is a flow diagram of a process for operational recovery of serverless applications in an illustrative embodiment.

In the context of the FIG. 1 embodiment, the serverless application manager 106 and the serverless application backup orchestrator 108 are illustratively configured to control the performance of steps 300 through 308 of the FIG. 3 process. Other system entities can additionally or alternatively be utilized to control or execute one or more of these steps.

It is to be appreciated that the FIG. 3 process and other serverless application state capture and recovery features and functionality described above can be adapted for use with other types of information systems configured to execute serverless applications on a compute services platform or other type of processing platform.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations involving execution of serverless applications. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different serverless applications with respective operational recovery functionality within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with automated capture and recovery of serverless application state as disclosed herein can provide a number of significant advantages relative to conventional arrangements.

For example, some embodiments are configured to generate a serverless application manifest that provides in a single logical unit all of the metadata and other information required to support operational recovery of a serverless application.

These and other embodiments automate the backup orchestration of serverless applications in a particularly efficient and effective manner.

Such arrangements overcome the difficulties that would otherwise be associated with conventional backups of serverless applications. As a result, organizations and other users can obtain the advantages of a serverless application architecture without compromising service level agreements of their production applications.

For example, illustrative embodiments overcome significant backup and recovery issues that might otherwise arise in conventional serverless application architectures (e.g., AWS Lambda). These embodiments can provide consistent operational recovery even in situations in which application function mapping conditions of the serverless application were changed or newer versions of application function container images were uploaded.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the compute services platform 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
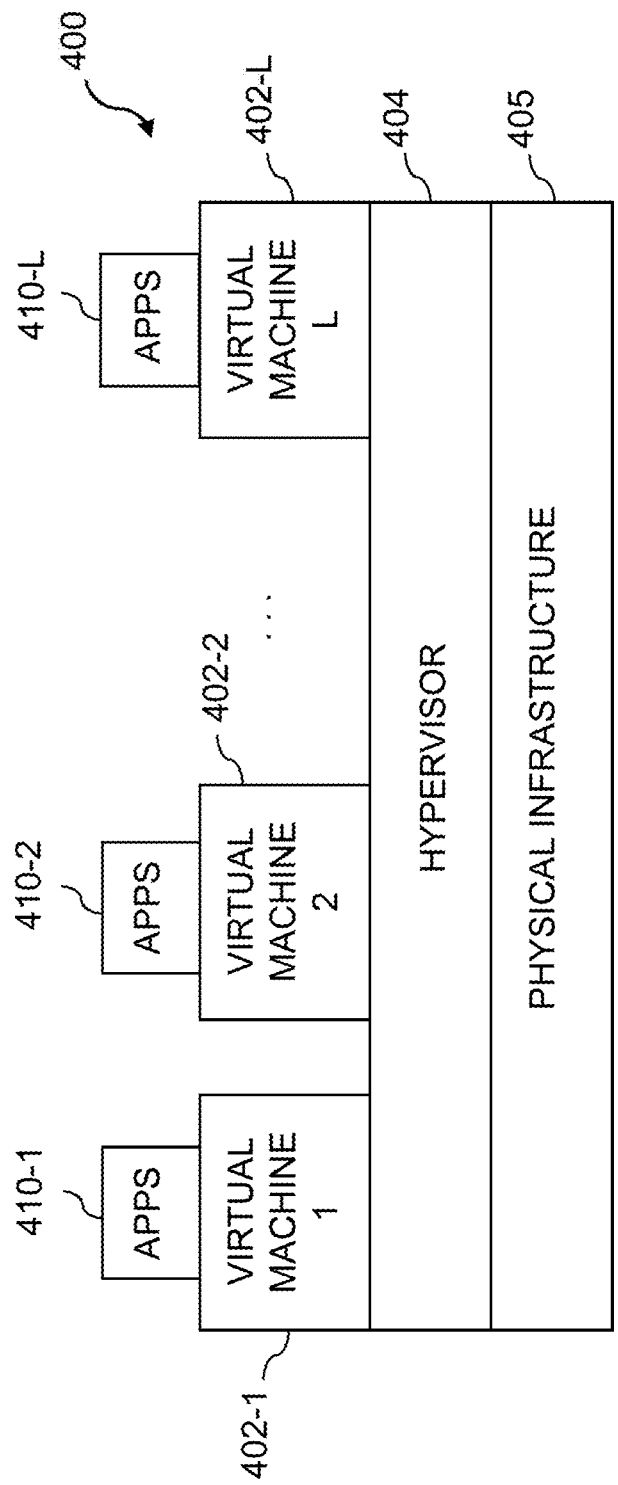
FIGS. 4 and 5 show examples of processing platforms that may be utilized to implement at least a portion of an information processing system in illustrative embodiments.
Figure 5:
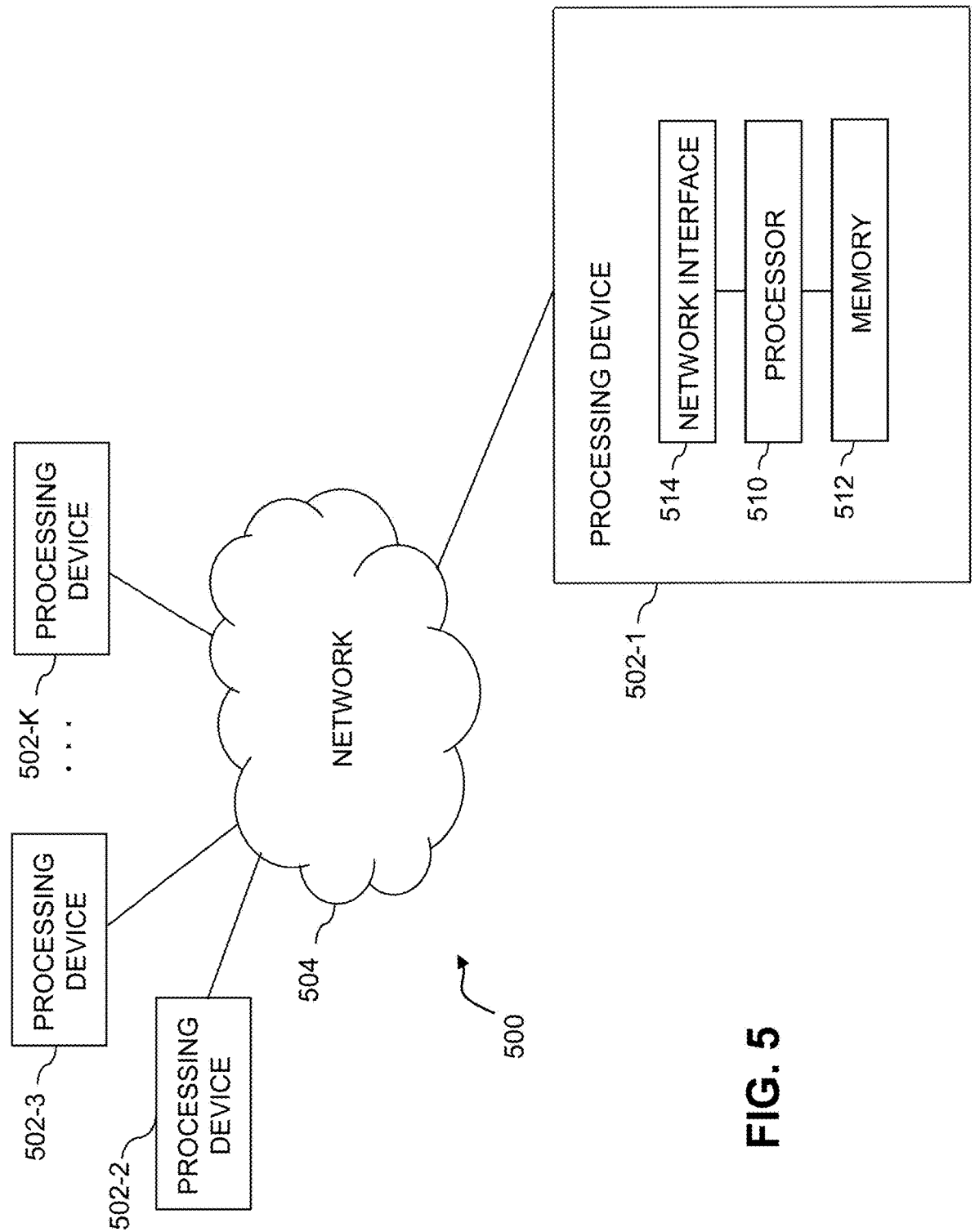

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, serverless applications, serverless application managers, orchestrators and manifests, application function mappings, application functions and backend services. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive a request to execute a serverless application;
to initiate execution of the serverless application responsive to the request;
to utilize one or more application function mappings to invoke one or more application functions with each such application function interacting with one or more backend services in executing the serverless application;
to capture state of the serverless application for a particular point in time; and
to perform operational recovery of the serverless application for the particular point in time utilizing the captured state;
wherein capturing state of the serverless application for the particular point in time comprises capturing the state in accordance with a previously-generated serverless application manifest that comprises:
the one or more application function mappings;
container image identifiers for respective ones of the application functions; and
descriptors for respective ones of the one or more backend services;
wherein the serverless application manifest is automatically generated in conjunction with execution of the serverless application.

2. The apparatus of claim 1 wherein the request initiating execution of the given serverless application is received in an application programming interface gateway of the processing platform from a user device over a network.

3. The apparatus of claim 1 wherein the application functions each execute in one or more stateless ephemeral containers of the processing platform.

4. The apparatus of claim 1 wherein the backend services comprise at least one of a database service, an object storage service and a message processing service.

5. The apparatus of claim 1 wherein the one or more application function mappings each specify one or more conditions under which particular ones of the application functions are invoked.

6. The apparatus of claim 5 wherein the conditions specified by the one or more application function mappings comprise respective events each relating to one or more of the backend services.

7. The apparatus of claim 1 wherein the serverless application manifest further comprises for each of the one or more application functions of the serverless application:
a version indicator for the corresponding container image;
instructions for obtaining corresponding application function binaries or associated code; and one or more bindings of the application function to respective ones of the backend services with which the application function interacts.

8. The apparatus of claim 7 wherein the instructions for obtaining corresponding application function binaries or associated code comprise instructions for downloading one or more of the application function binaries or associated code from a container registry or code hub.

9. The apparatus of claim 1 wherein the processing platform comprises a serverless application backup orchestrator configured to capture state of the serverless application and to perform operational recovery of the serverless application.

10. The apparatus of claim 1 wherein the processing platform in capturing the state of the serverless application for the particular point in time is further configured:
to store metadata for the one or more application function mappings that are part of the serverless application manifest;
to store a copy of a current binary or associated code for each application function container image identified in the serverless application manifest;
to generate backups for each backend service having a descriptor in the serverless application manifest; and
to generate additional metadata combining the metadata for the one or more application function mappings, the one or more stored copies of the current binaries or associated code, and the backups of the one or more backend services, into a serverless application backup for the particular point in time.

11. The apparatus of claim 10 wherein the processing platform in performing operational recovery of the serverless application for the particular point in time utilizing the captured state is further configured:
to obtain the serverless application backup for the particular point in time;
to update the one or more application function mappings based at least in part on the stored metadata;
to redeploy the application function container images from respective stored copies of their current binaries or associated code;
to recover the backend services from their respective backups; and
to execute the serverless application utilizing the updated one or more application function mappings, the redeployed application function container images and the recovered backend services.

12. The apparatus of claim 1 wherein the processing platform is further configured:
to capture state of application functions and backend services data of the serverless application at each of a plurality of different points in time in accordance with the previously-generated serverless application manifest;
to permit user selection of at least one of a plurality of serverless application backups characterizing the captured state for respective ones of the points in time; and
to recover the serverless application using the selected at least one of the serverless application backups;
wherein the user is permitted to select a first one of the serverless application backups for recovering the application functions and a second one of the serverless application backups different than the first serverless application backup for recovering the backend services data;
the application functions and the backend services data of the serverless application thereby being separately recoverable from different ones of the serverless application backups corresponding to respective different points in time.

13. The apparatus of claim 1 wherein initiating execution of the serverless application responsive to the request comprises initiating execution of the serverless application based at least in part on the server application manifest.

14. A method comprising:
receiving a request to execute a serverless application;
initiating execution of the serverless application responsive to the request;
utilizing one or more application function mappings to invoke one or more application functions with each such application function interacting with one or more backend services in executing the serverless application;
capturing state of the serverless application for a particular point in time; and
performing operational recovery of the serverless application for the particular point in time utilizing the captured state;
wherein capturing state of the serverless application for the particular point in time comprises capturing the state in accordance with a previously-generated serverless application manifest that comprises:
the one or more application function mappings;
container image identifiers for respective one of the application functions; and
descriptors for respective ones of the one or more backend services;
wherein the serverless application manifest is automatically generated in conjunction with execution of the serverless application; and
wherein the method is performed by at least one processing platform comprising a plurality of processing devices.

15. The method of claim 14 wherein capturing the state of the serverless application for the particular point in time further comprises:
storing metadata for the one or more application function mappings that are part of the serverless application manifest;
storing a copy of a current binary or associated code for each application function container image identified in the serverless application manifest;
generating backups for each backend service having a descriptor in the serverless application manifest; and
generating additional metadata combining the metadata for the one or more application function mappings, the one or more stored copies of the current binaries or associated code, and the backups of the one or more backend services, into a serverless application backup for the particular point in time.

16. The method of claim 15 wherein performing operational recovery of the serverless application for the particular point in time utilizing the captured state further comprises:
obtaining the serverless application backup for the particular point in time;
updating the one or more application function mappings based at least in part on the stored metadata;
redeploying the application function container images from respective stored copies of their current binaries or associated code;
recovering the backend services from their respective backups; and executing the serverless application utilizing the updated one or more application function mappings, the redeployed application function container images and the recovered backend services.

17. The method of claim 14 wherein the one or more application function mappings each specify one or more conditions under which particular ones of the application functions are invoked.

18. A computer program product comprising a non-transitory processor-readable storage medium having stored therein program code of one or more software programs, wherein the program code when executed by at least one processing platform causes said at least one processing platform:

to receive a request to execute a serverless application;

to initiate execution of the serverless application responsive to the request;

to utilize one or more application function mappings to invoke one or more application functions with each such application function interacting with one or more backend services in executing the serverless application;

to capture state of the serverless application for a particular point in time; and to perform operational recovery of the serverless application for the particular point in time utilizing the captured state;

wherein capturing state of the serverless application for the particular point in time comprises capturing the state in accordance with a previously-generated serverless application manifest that comprises:

the one or more application function mappings;

container image identifiers for respective one of the application functions; and descriptors for respective ones of the one or more backend services;

wherein the serverless application manifest is automatically generated in conjunction with execution of the serverless application.

19. The computer program product of claim 18 wherein the processing platform in capturing the state of the serverless application for the particular point in time is further configured:

to store metadata for the one or more application function mappings that are part of the serverless application manifest;

to store a copy of a current binary or associated code for each application function container image identified in the serverless application manifest;

to generate backups for each backend service having a descriptor in the serverless application manifest; and to generate additional metadata combining the metadata for the one or more application function mappings, the one or more stored copies of the current binaries or associated code, and the backups of the one or more backend services, into a serverless application backup for the particular point in time.

20. The computer program product of claim 19 wherein the processing platform in performing operational recovery of the serverless application for the particular point in time utilizing the captured state is further configured:

to obtain the serverless application backup for the particular point in time;

to update the one or more application function mappings based at least in part on the stored metadata;

to redeploy the application function container images from respective stored copies of their current binaries or associated code;

to recover the backend services from their respective backups; and to execute the serverless application utilizing the updated one or more application function mappings, the redeployed application function container images and the recovered backend services.

* * * * *